No. 806,734. PATENTED DEC. 5, 1905.
C. E. CARPENTER.
APPARATUS FOR STOPPING ELECTRIC MOTORS.
APPLICATION FILED APR. 29, 1904.
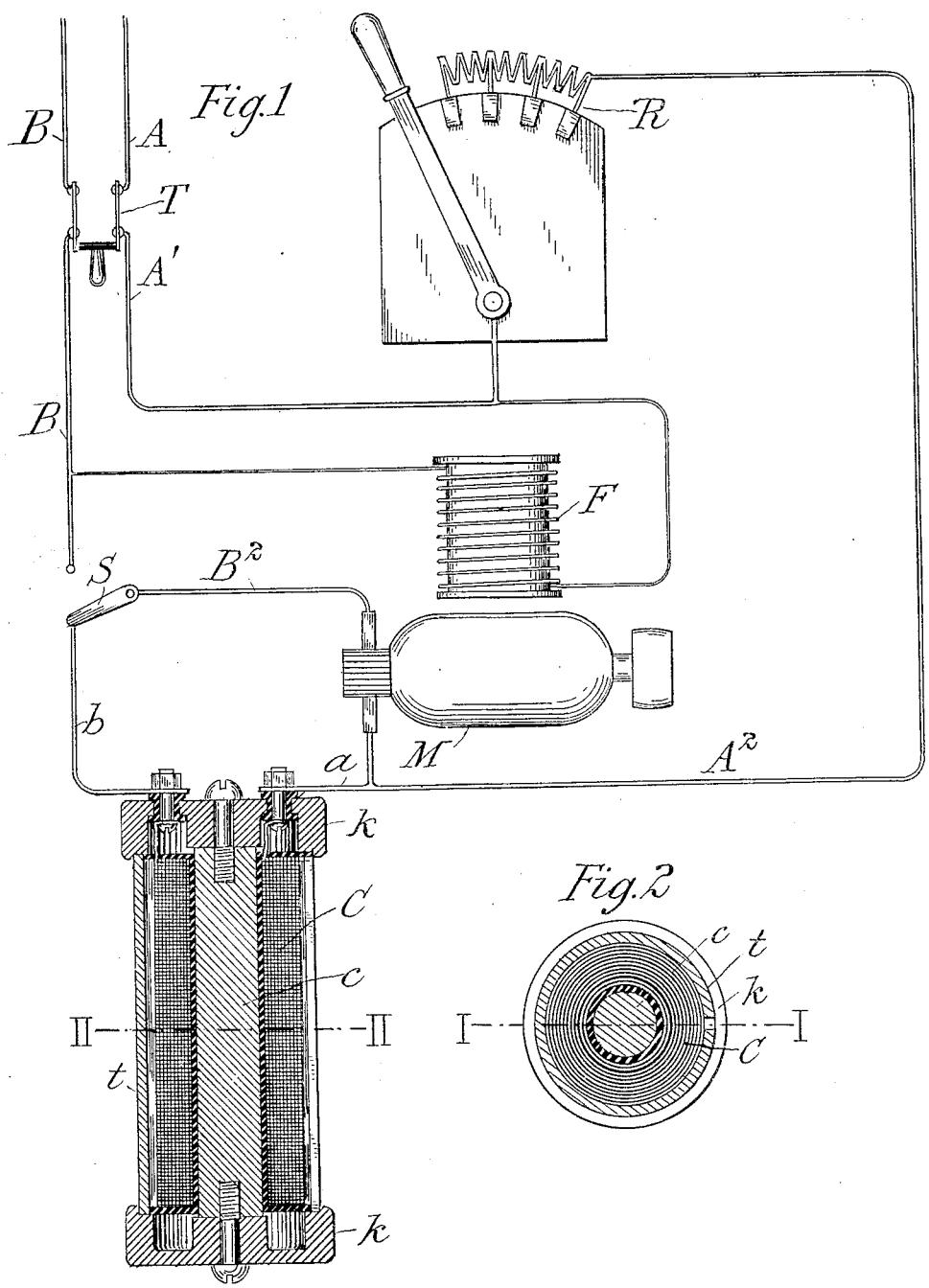
Witnesses:
Edward J. Murphy
Samuel W. Balch
Inventor:
Charles E. Carpenter
by Thomas Ewing Jr.
Attorney

UNITED STATES PATENT OFFICE.

CHARLES E. CARPENTER, OF NEW YORK, N. Y., ASSIGNOR TO THE CUTLER-HAMMER MFG. CO., OF MILWAUKEE, WISCONSIN, A CORPORATION OF WISCONSIN.

APPARATUS FOR STOPPING ELECTRIC MOTORS.

No. 806,734.  Specification of Letters Patent.  Patented Dec. 5, 1905.

Application filed April 29, 1904. Serial No. 205,514.

*To all whom it may concern:*

Be it known that I, CHARLES E. CARPENTER, a citizen of the United States of America, and a resident of the city, county, and State of New York, have invented certain new and useful Improvements in Apparatus for Stopping Electric Motors, of which the following is a specification.

This invention relates to an electromagnetic means for exerting a braking effect on an electric motor when it is desired to stop the motor and the machinery with which the motor is connected.

One object of this invention is by the suitable combination of electromagnetic inductance and ohmic resistance in the armature-circuit to effect the electric braking and stoppage of the motor and the machinery connected thereto in a lesser time or a lesser distance of travel with a given maximum strain on the machinery than would be possible if the motion of the armature were checked with the same allowable strain by the insertion in the armature-circuit of comparatively non-inductive resistance of any of the usual commercial forms.

Another object of the invention is by the aforesaid combination to effect the electric braking of the motor-armature with a lesser maximum strain than would be possible if the motion of the armature were checked in the same time or with the same distance of travel by the insertion in the armature-circuit of comparatively non-inductive resistance of any of the usual commercial forms.

In practice I preferably combine electromagnetic inductance and ohmic resistance of such values that both of the foregoing objects are simultaneously attained, and the same wire which is employed for the ohmic resistance is coiled on a magnet of suitable construction to give the requisite electromagnetic inductance. By these means I am enabled to stop a motor and connected machinery quickly without undue strain and without the resistance of friction-brakes or mechanical friction other than the friction which is normally present in the machinery.

Referring now to the accompanying sheet of drawings, which forms a part of this specification, Figure 1 is a diagrammatic view showing the connections between leads which are the source of electrical supply, a starting-rheostat, and a shunt-motor, and connections between the armature of the motor and a magnet which constitute the electromagnetic inductance and ohmic resistance of the brake-circuit, the magnet being shown in section on the line I I of Fig. 2. Fig. 2 is a cross-section through the magnet on the line II II of Fig. 1.

Current is supplied from the two leads A B to the armature M and shunt-field F of the electric motor when the motor is to be driven. The armature-circuit is from the lead A through a two-pole switch T, lead A', starting-rheostat R, and lead A² to the armature, thence through lead B², switch S, lead B', two-pole switch T to lead B. The shunt field-circuit is from lead A through the two-pole switch T, lead A', shunt-field F, lead B', two-pole switch T, lead B.

The application of the braking effect, which is in the nature of an emergency operation, is preferably effected by the operation of the switch S, which is arranged to disconnect the armature from the source of supply and without delay and by continuous movement of the switch to its new position reconnect the armature in a new circuit, which will be termed the "brake-circuit," in which the requisite electromagnetic inductance and ohmic resistance is introduced by means of the inductance-coil C, which is wound on a suitably-proportioned magnet. In the form illustrated this magnet consists of a soft-iron core $c$ for the coil, a wrought-iron tube $t$, surrounding the coil, and two cast-iron caps $k\ k'$, each of which contacts with one end of the tube and one end of the core. On throwing the switch S to the position illustrated the brake-circuit is established from the armature through the connections $a$, magnet-coil C, connection $b$, switch S, and connection B² to the armature. The connection of the field to the source of supply remains as before, and the armature driven by its own momentum and the momentum of the connected machinery now generates current. The energy of this current is consumed principally in two ways: first, in the inductive action of the coil in magnetizing the iron of the magnetic circuit, and, second, in overcoming the ohmic resistance of the electrical circuit which is mainly in the coil. Owing to the consumption of energy in magnetizing the iron, the ohmic resistance of the circuit may be much less without undue current-flow and consequent strain on the armature and connected machinery than where an ordinary form of comparatively non-inductive resistance is employed. As the speed of the armature falls, and with it the electromotive force developed by the armature, there would with a non-inductive circuit be a corresponding falling off in current and in the braking effect, which would soon become very weak; but with electromagnetic inductance in the circuit that part of the energy which is at first converted into magnetic energy and for the moment stored as such energy reacts on the circuit and sustains the current-flow and the braking effect on the armature. Owing to the lesser ohmic resistance permissible, this after current will be large and the braking effect will be sustained after the motor has slowed down, with the result that nearly the entire energy represented by the momentum of the armature and connected machinery will be converted into current-flow and consumed in the resistance of the circuit in a lesser time and distance of travel and with more uniformity—*i. e.*, with less maximum current-flow at any moment while the braking action is taking place than would be possible with a non-inductive brake-circuit. In order to avoid excessive Foucault currents, the inclosing tube is slotted longitudinally. Further slotting of the parts of the magnetic circuit or their lamination has not been found to be of sufficient importance to warrant the expense. It is merely necessary that the magnet be so designed that the magnetization and discharge of the magnetism in order to serve a useful purpose in this invention should be comprised within the time within which the motor and connected machinery is to be slowed down and stopped.

This invention has a particularly useful application in connection with heavy printing-presses and machine-tools which are individually driven by electric motors. In such work it is often of importance to be able to bring the press or tool to rest in the shortest permissible time in which it can be done without injury to the machinery.

As a practical illustration assume the application of the invention to a controller for a five-horse-power two-hundred-and-twenty volt shunt-wound motor connected to a printing-press, for which this size motor is adapted. Under these conditions a suitable magnet for the brake-circuit will be one with a core one inch in diameter and six inches in length, forming part of a closed magnetic circuit, as illustrated, and wound with twelve hundred turns of No. 19 insulated copper magnet-wire. Such coil will have 3.2 ohms resistance. This is sufficient protective resistance for the circuit in coöperation with the electromagnetic inductance, for the current-flow in braking the motor will not exceed twenty-six amperes at any moment, and the apparatus will be brought to rest in a little over two seconds. The strain on the shafts, keys, and gear-teeth of the connected machinery is proportional to this current-flow, and this amount of current-flow has been found to be within safe limits. The effect of the electromagnetic inductance in contributing to these desirable results will be evident on comparison with the effect when non-inductive resistance and circuit are employed. When this is the case, a resistance of at least seven ohms has been found to be necessary, and with this amount of non-inductive resistance the initial current-flow rises to thirty amperes. There is at once a heavy strain on the machinery, but such a rapid falling off of both potential and current-flow as the motor commences to slow down that over three seconds' time were required to stop the machinery.

For motors of other sizes, larger or smaller, the size and winding of the magnet should be increased or diminished proportionally to the current used by the motor.

I prefer to effect the switching of the motor-armature from the source of supply by devices such as are illustrated in my application for patent of the United States on an electric switch and circuit-breaker, filed January 16, 1904, Serial No. 189,302, issued August 23, 1904, as Patent No. 768,214.

What I claim as new, and desire to secure by Letters Patent of the United States, is—

1. The combination with an electric motor, of a brake-circuit containing a highly-inductive resistance in series with the armature of the motor, and means for maintaining the field for the armature in a circuit independent of the resistance, and thereby checking the speed of the motor, substantially as described.

2. The combination with an electric motor, of a brake-circuit containing a highly-inductive resistance in series with the armature of the motor, means for maintaining the field for the armature in a circuit independent of the resistance, and means for establishing the brake-circuit through the inductive resistance and armature to check the speed of the motor, substantially as described.

3. The combination with an electric motor, of a brake-circuit containing an electromagnetic inductance-coil in series with the armature of the motor, means for maintaining the field of the motor in a circuit independent of the resistance, and means for establishing the brake-circuit through the inductance-coil and armature to check the speed of the motor, substantially as described.

4. The combination with an electric motor, of a brake-circuit containing an electromagnetic inductance-coil in series with the armature of the motor, a permanently-closed magnetic circuit for the coil, means for maintaining the field of the motor, and means for establishing the brake-circuit through the inductance-coil and armature to check the speed of the motor, substantially as described.

Signed by me at New York city, borough of Manhattan, this 26th day of April, 1904.

CHARLES E. CARPENTER.

Witnesses:
 THOMAS EWING, Jr.,
 SAMUEL W. BALCH.